(12) United States Patent
Blondell

(10) Patent No.: US 10,772,338 B2
(45) Date of Patent: Sep. 15, 2020

(54) SHELTER (TM) SEAFOOD MULTI TOOL

(71) Applicant: Shelby Ann Blondell, Linthicum, MD (US)

(72) Inventor: Shelby Ann Blondell, Linthicum, MD (US)

( * ) Notice: Subject to any disclaimer, the term of this patent is extended or adjusted under 35 U.S.C. 154(b) by 0 days.

(21) Appl. No.: 15/732,619

(22) Filed: Dec. 4, 2017

(65) Prior Publication Data

US 2019/0166857 A1 Jun. 6, 2019

(51) Int. Cl.
*A22C 29/00* (2006.01)
*B67B 7/16* (2006.01)
*B25F 1/00* (2006.01)
*A22C 29/02* (2006.01)

(52) U.S. Cl.
CPC ............ *A22C 29/027* (2013.01); *B25F 1/006* (2013.01); *B67B 7/16* (2013.01)

(58) Field of Classification Search
CPC ..... A22C 29/027; B25F 1/006; A47G 21/062; B67B 7/16
See application file for complete search history.

(56) References Cited

U.S. PATENT DOCUMENTS

| 763,553 | A | | 6/1904 | Goddard | |
| D463,239 | S | * | 9/2002 | Makedonski | ................. D8/105 |
| 8,622,789 | B1 | | 1/2014 | Uresti | |
| 8,662,966 | B2 | | 3/2014 | Rizzo | |
| 10,058,988 | B1 | * | 8/2018 | Pintal | ...................... B25F 1/006 |
| 2011/0239471 | A1 | * | 10/2011 | Day | ........................ B25G 1/102 |
| | | | | | 30/342 |
| 2012/0190282 | A1 | * | 7/2012 | Rizzo | ................... A22C 29/027 |
| | | | | | 452/6 |
| 2017/0247925 | A1 | * | 8/2017 | Sanchez | .................... E05F 7/00 |
| 2018/0311803 | A1 | * | 11/2018 | Hertaus | ................... B27B 21/04 |

FOREIGN PATENT DOCUMENTS

CN 201471382 U * 5/2010

* cited by examiner

*Primary Examiner* — Daniel J Colilla

(57) ABSTRACT

A substantially flat tool for the function of deshelling or cracking an object, combined with a bottle opener and function of a picker or knife, featuring a thin striking surface which favors cracking over smashing.

6 Claims, 4 Drawing Sheets

SHELTER (TM) SEAFOOD MULTI TOOL

CROSS-REFERENCE TO RELATED APPLICATIONS

This application claims priority from U.S. Provisional Application [62/600,728-], filed Feb. 27, 2017.

BACKGROUND OF THE INVENTION

THE SHELLER, By Shelby Blondell™, SEAFOOD MULTI-TOOL, affords the principle function of a, substantially planar, or flat tool for the function of deshelling or cracking an object combined with a bottle opener and function of a picker or knife. Traditional mallets are thick in surface area causing the object to be hit with a brunt force causing a smashing effect rather than a crack. This is not as affective for eating crustaceans and other foods that have an outer casing or shell such as crabs. Having a flat design, which is not limited to a rectangle shape (As seen in Element 1) allows for an effective use of mallet, less storage space, and possibilities for logos to appear.

Combining the functions of a mallet, bottle opener and a picker, in a single tool provides many advantages of portability, convenience, easy usage, easy storage, and easy cleanup.

FIELD OF THE INVENTION

Description of Related Art Including Information Disclosed

Numerous inventions such as mallets, seafood tools, knives, and bottle openers exist. The principle feature of the SEAFOOD MULTI-TOOL, is the flat design providing efficiency and a crack rather than a smashing effect. Another innovation of the SEAFOOD MULTI-TOOL lies in the knife, which is smooth and not ridged, for safety. THE SEAFOOD MULTI-TOOL is a multi-tool with a combination of a mallet, picker or knife, and bottle opener, setting it apart.

BRIEF SUMMARY OF INVENTION

The SEAFOOD MULTI-TOOL is a flat, multi-tool used for seafood and other foods with an outer casing, encompassing a mallet, picker and bottle opener.
SHELLER™, THE SEAFOOD MULTI-TOOL

BRIEF DESCRIPTION OF THE SEVERAL VIEWS OF THE DRAWLING

Figure 1:
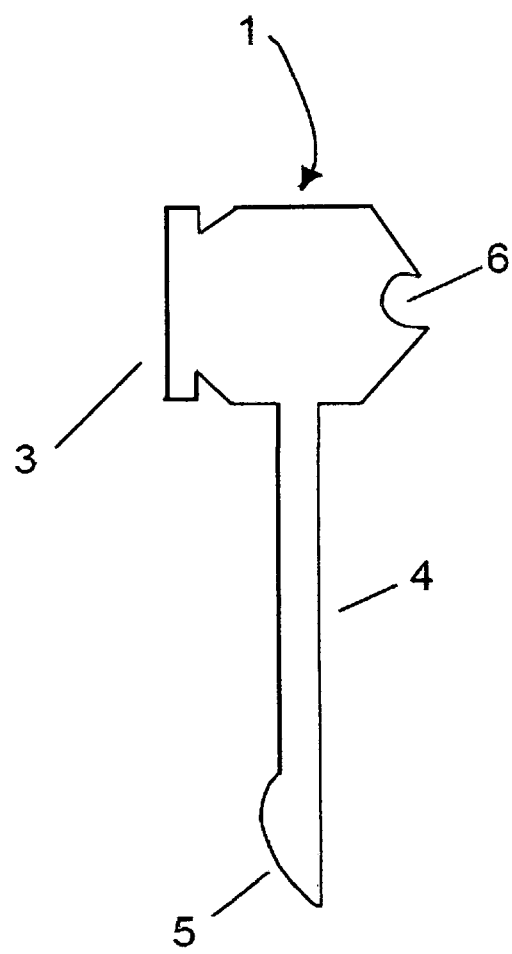
Figure 2:
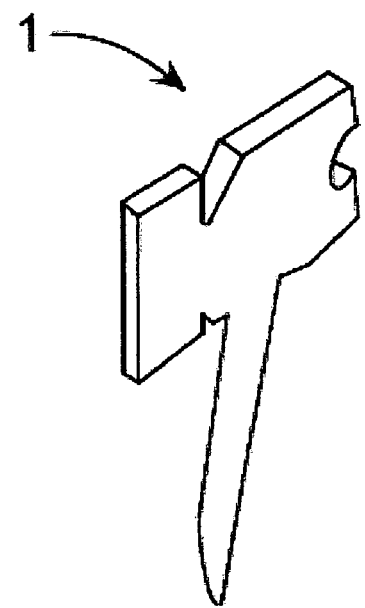
Figure 3:
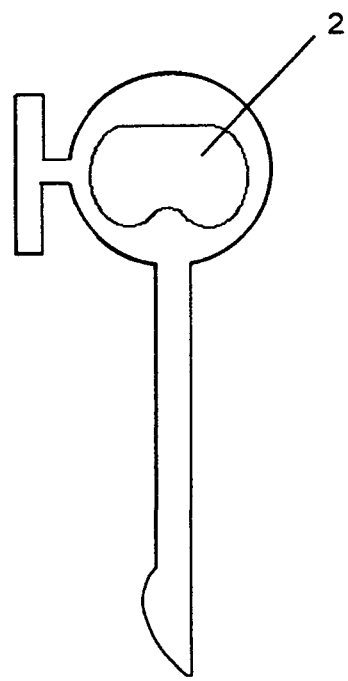
Figure 4:
Figure 5:
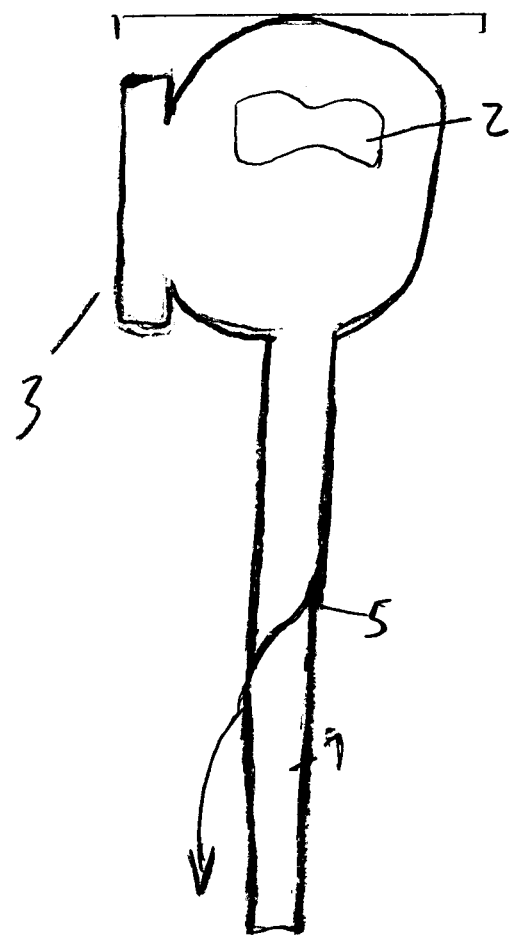
Figure 6:
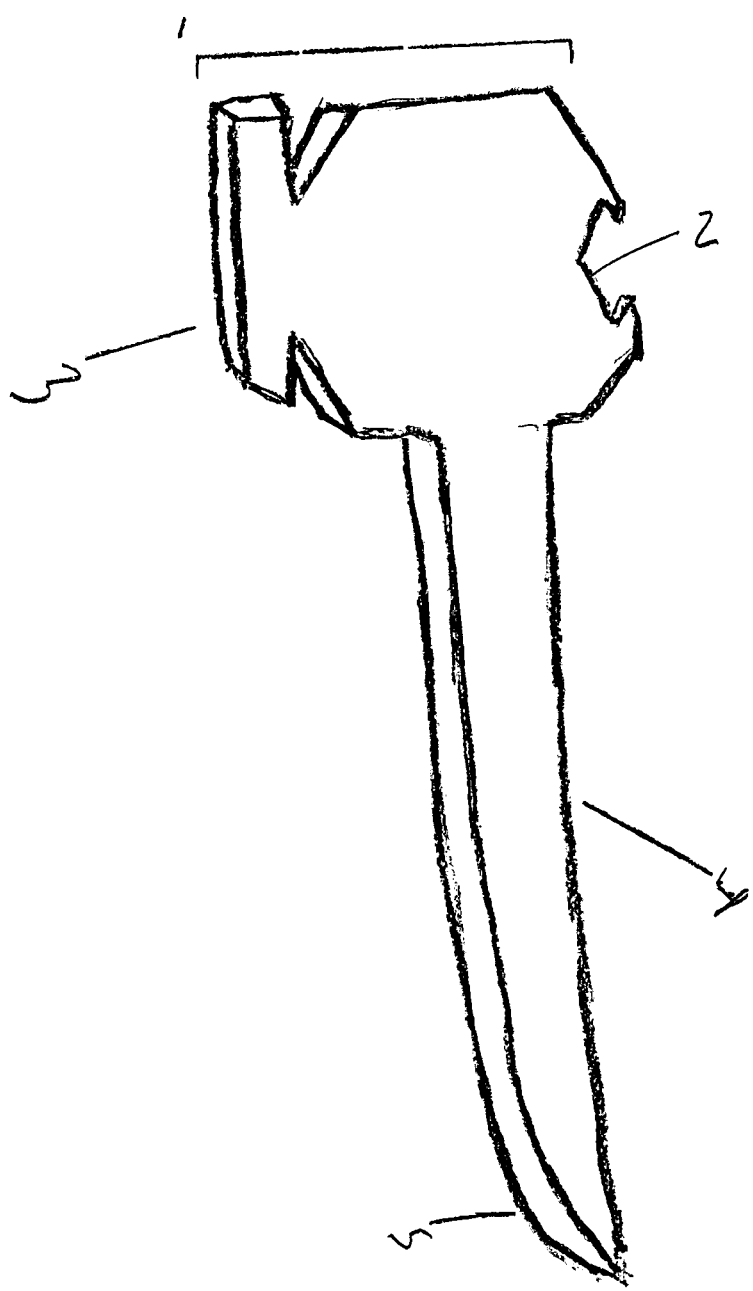

FIG. 1 Is a forward view of invention
FIG. 2 Is a top view of invention
FIG. 3 Is also a front view of one possible adaptation showcasing the bottle opener in the center rather than the side.
FIG. 4 is a side view of invention

DETAILED DESCRIPTION OF THE INVENTION

In a preferred embodiment the SEAFOOD MULTI-TOOL will have a top (Element 1), bottom (Element 5), and tow sides, for convenience one being designated left (Element 3) and the opposite side being designated right (Element 6). Left and right are relative to each other. The left, but not limited to the left, is a mallet with the opposing side, or right side being the bottle opener, a handle (Element 4) is connected to Element 5, which ends in a picker resembling a table knife. Per FIG. 3, you will see an adaptation that shows the bottle opener in the center rather than the side of the flat mallet. Element 2, 3 & 6 are on the top portion (Element 1) of the tool. The bottle opener may be in the center of Element 1. The bottle opener may be optimal on the right side, element 6, and opposing element 3.

The operation of the invention will now be described in the context of use in eating hard shell crabs. The mallet is used to crack claws and the outer casing. The claws are filled with much meat. A mallet is used to break the claw so meat can be retracted. The bottle opener segment is used to open and enjoy a cold beverage throughout eating crabs. The picker is used for various activities such as, opening the outtershell, scrapping inside mustard and unwanted or nonedible pieces, and retracting meat from claws after cracked with mallet. The picker end should be used for other activities that are enjoyed with steamed crabs such as scraping butter onto your corn on the cob.

Traditionally eating shellfish involves multiple tools or utensils such plastic or wooden bottle openers, knives, and or mallets. For individuals and restaurants the traditional way of enjoying crabs can be costly, take up much space and involves cleaning many tools or throwing away after. The SEAFOOD MULTI-TOOL offers the optimal experience for enjoying seafood. For these reasons The Sheller encompasses a mallet for the function of deshelling or cracking an object. THE SHELLER encompasses a bottle opener. The SEAFOOD MULTI-TOOL encompasses a picker or knife life point. Combining 3 tools in one saves space, by eliminating the need for multiple tools.

Traditional mallets cause a shattering effect rather than a crack. This causes you to have to take off pieces of shell from the meat. The SHELLER™, SEAFOOD MULTI TOOL holds a utility of a flat mallet or tool means more efficiency. Less space is taken up from the flat design which is optimal for restaurants and at home use. The device should be flat and relatively thin. Relatively thin or planar, means that the device should be thin enough to crack rather than smash a shell but not so thin that the device would break in use. For the prototypes tested, this means that the device should preferably be no more than 0.215 inches thick, with a preferred minimum thickness of 0.016 inches, which is a variable depending upon the material used. A thinner material is possible. The prototypes length from end to end is 7.5 inches with a thickness of 0.181 inches. The mallet width is 2.5 inches and the width of the handle stands at ½ of an inch. Prior art of some multi tools feature a small design. With THE SHELLER, it is important to have a handle area so that the thin mallet side can strike and crack. Also the handle is used as a function to break a shell in half. For instance one may use Element 5 to open the shell, Element 4 to break the shell in half and down the chest of said crab, the mallet end, Element 3 to crack the claw, Element may be used again the get excess meat from the claw and then Element 6 may be used to crack open a cold drink.

The Seafood Multi-tool should be made of a durable material that is strong enough to withstand impact with a shell and, preferably washable (although some applications may prefer inexpensive material to be disposable.) The use of dishwasher safe material such as Stainless Steel is optimal for efficiency without rust and to provide sanitation. Other materials may be used such as but not limited to metal, silver, gold, plastic, aluminum, bronze, acrylic, plastic, brass, cooper, or titanium. Traditional mallets are dirty and are unable to be adequately cleaned because of the wooden surface. While wood is a possible material, it is less preferred.

The flat utility of the mallet allows for the seafood multi-tool to be used on a variety of seafood's. Crabs, including dungeons, king and snow are more effectively cracked for meat to be extracted. Lobster is among other seafood's that can be used with the SEAFOOD MULTI-TOOL. The flat surface of element 1 means that shells can also be smashed with the larger area; such as cracking garlic.

The use of a durable material allows for the bottle opener to be effective and not break after use. The Seafood Multi-Tool could be made of multiple materials per tool. For instance a wooden mallet, but metal piece for the bottle opener to allow the function. For restaurants, large amounts of money are spent on purchasing wooden mallets and plastic knives that both break and must be thrown away. Traditional mallets depth also takes up storage space. The Seafood Multi-tool offers easy storage and an easy clean saving households and businesses, time and money.

The smooth picker or knife (Element 5) offers an element of safety to customers. Element 5 is used to open the outer casing or shell. Element 5 is also used to scrap lungs, insides, or other nonedible Pieces. The pointed end, picker, or knife also allows meat to be extracted from the claws. A normal knife is not made specifically for eating crustaceans. Table knives that are sometimes used in the process have a ridged or sharp edge. Element 5 can be used for as picking devise connected by a handle (Element 4) connecting Element 1 to Element 5. Element 5 may or may not be pointed.

Retracting meat from crabs and other seafood, are experiences that often involve a cold beverage. The Seafood Multi-Tool conveniently offers three in one tools, to afford ease when eating, and cleaning. Some adaptations of The Seafood Multi-Tool may not include a bottle opener. The bottle opener is also a function to be used on seafood's such as Shrimp. Shrimp, can be defined with this feature as well.

The invention claimed is:

1. A tool for the facilitating eating crustations and other foods with an outer casing, said tool comprising:
    a single continuous flat body;
    the body including a top and bottom element;
    said top element comprising:
    a first and a second side;
    said first side and second side opposing each other;
    a thin striking surface defined at first side;
    a bottle opener defined within an edge of second side;
    said bottom element forming a handle having a first and second side, wherein at a free end of the handle a picker is formed by the first side of the handle curving toward a second side of said handle.

2. The tool according to claim 1, wherein said picker had a smooth edge.

3. The tool according to claim 1, wherein the tool is manufactured from a material that is durable and dishwasher safe.

4. The tool according to claim 3, wherein said material is selected from the group consisting of: metal, silver, gold, wood, plastic, aluminum, stainless steel, bronze, acrylic, plastic, brass, copper and titanium.

5. The tool according to claim 4, wherein said material is stainless steel.

6. The tool according to claim 1, wherein said tool is thin in design to afford a crack rather than smash like prior art.

* * * * *